United States Patent [19]

Peterson

[11] Patent Number: 4,695,891
[45] Date of Patent: Sep. 22, 1987

[54] VARIABLE SPEED VIDEO CAMERA

[75] Inventor: Dean M. Peterson, Escondido, Calif.

[73] Assignee: Eastman Kodak Company, Rochester, N.Y.

[21] Appl. No.: 930,201

[22] Filed: Nov. 13, 1986

[51] Int. Cl.⁴ .............................................. H04N 5/30
[52] U.S. Cl. .............................. 358/213.13; 358/225; 352/216
[58] Field of Search .......................... 358/213.13, 225; 352/216, 217

[56] References Cited

U.S. PATENT DOCUMENTS

| | | | |
|---|---|---|---|
| 3,300,271 | 1/1967 | Yamamoto | 352/214 |
| 3,303,271 | 2/1967 | Hecker | 178/5 |
| 3,490,835 | 1/1970 | Nemeth et al. | 352/14.1 |
| 3,531,194 | 9/1970 | Roppel et al. | 352/216 |
| 3,602,585 | 8/1971 | Steibl et al. | 352/216 |
| 3,787,116 | 1/1974 | Shimizu | 352/141 |
| 4,161,000 | 7/1979 | Cleveland | 358/225 |
| 4,171,529 | 10/1979 | Silberberg et al. | 358/209 |
| 4,257,693 | 3/1981 | Hirata et al. | 352/209 |
| 4,301,476 | 11/1981 | Keller et al. | 358/209 |
| 4,471,388 | 9/1984 | Dischert | 358/320 |
| 4,504,866 | 3/1985 | Saito | 358/213 |
| 4,532,550 | 7/1985 | Bendell et al. | 358/213 |
| 4,545,659 | 10/1985 | Swinehart et al. | 352/216 |
| 4,551,763 | 11/1985 | Swinehart et al. | 358/225 |
| 4,571,629 | 2/1986 | Horio et al. | 358/225 |

FOREIGN PATENT DOCUMENTS 3022786 1/1981 Fed. Rep. of Germany .

Primary Examiner—Gene Z. Rubinson
Assistant Examiner—L. C. Schroeder
Attorney, Agent, or Firm—William F. Noval

[57] ABSTRACT

A compact video camera which is operable at continuously variable shutter speeds to capture high speed events which may be recorded and played back in slow motion for scene analysis. The video camera includes an image sensor, a zoom lens, and a rotating shutter which is continuously adjustable to different shutter speeds. The camera components are dimensioned and configured in a compact design for easy-to-use hand-held operation. The shutter includes a pair of rotating shutter discs having openings which are selectively adjustable relative to each other to vary the interval during which the imager sensor is exposed to a scene projected onto it by the zoom lens. The shutter discs are mounted on respective first and second holow shafts. The first shaft is rotatably and slidably mounted on a portion of the second shaft by a linkage. Adjustment of the relative rotational position of the two disc to control the size of the relative shutter opening is effected by a cable which is connected at one end to the first shaft, which is passed through the hollow shafts and which is connected at its other end to a control member. The control member is actuated by a change in sensor signal intensity to effect a change in relative shutter opening.

3 Claims, 7 Drawing Figures

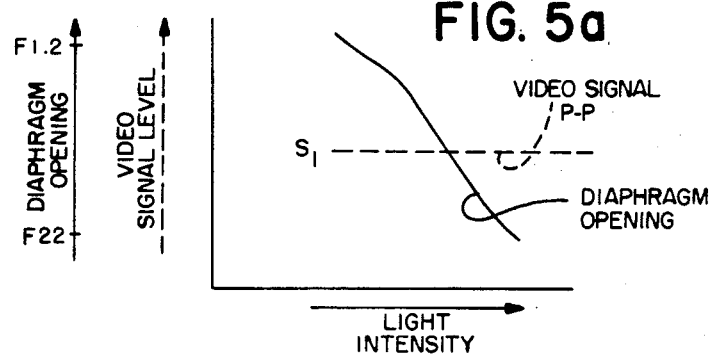
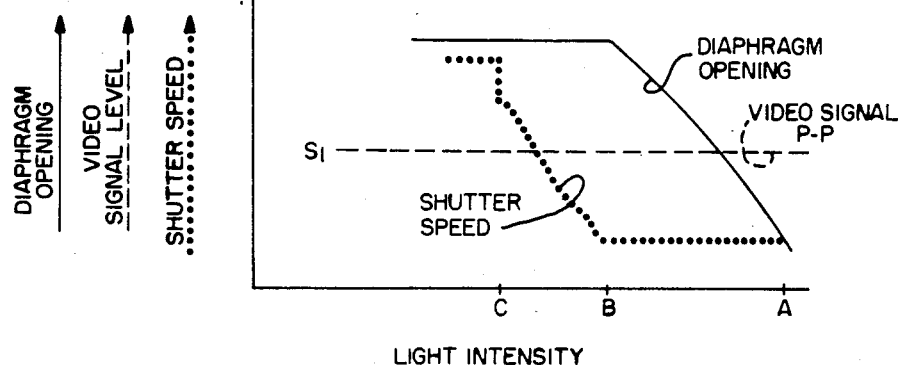
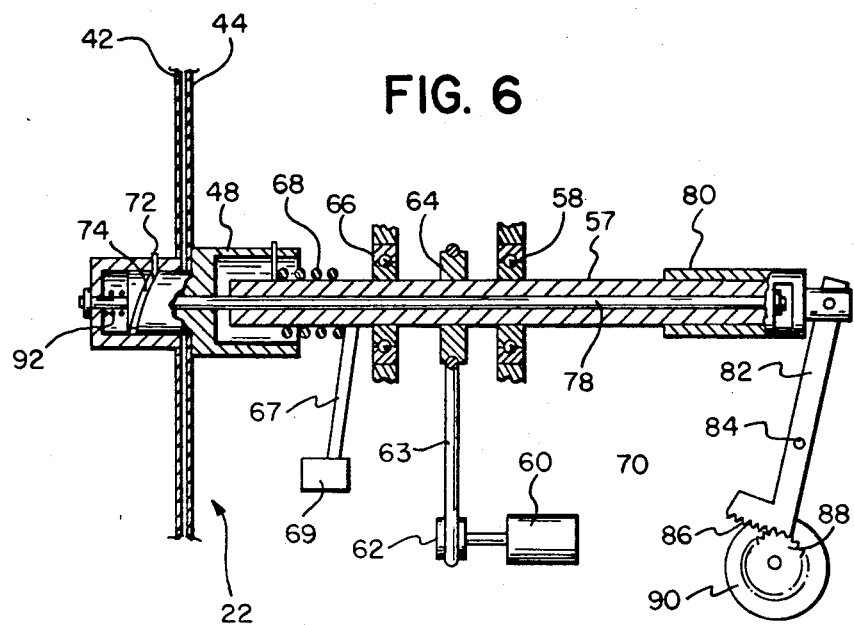

VARIABLE SPEED VIDEO CAMERA

BACKGROUND OF THE INVENTION

This invention relates in general to video apparatus capable of capturing fast moving events. More particularly, this invention relates to video apparatus including a compact, easy-to-use variable speed camera having a rotating shutter which is continuously variable over a wide range of shutter speeds.

The need often arises for recording high speed or rapidly changing scenes so that the scene may be played back in slow or stopped motion in order to analyze the scene. Where a standard video camera is used to record high speed events, the frame rate of the camera is too slow to stop the motion of the event. There is thus a likelihood of blrring of the recorded image so that analysis of the scene is difficult. Such analysis capabilities are for example, desirable in analyzing the motions of an athlete while engaged in an athletic event, such as football, baseball, golfing, or the like. Thus, it may be desirable to capture the motion of a swinging golf club in order to correct a defect in the golfer's swing. Stop action shots may be used in football games in order to analyze the correctness of a referee's call on a play, or to analyze the movements of a football player, such as those of a quarterback in throwing a football to a receiver. Although motion picture cameras have been used to analyze such athletic events, there have been problems since film is costly and the delay between filming and viewing is far too long to be useful for more than archival use. Although various video systems have been proposed which would obviate these objections to the use of film by reducing recording media cost and making playback instantly available through a television monitor, the video systems have been expensive, heavy, bulky, and hard to use. Moreover, where manually adjustable shuttered video cameras have been proposed, the possibility existed that a specific high speed event is not captured because an inadequate shutter speed has been chosen by the camera operator.

SUMMARY OF THE INVENTION

According to the present invention, there is provided video apparatus which includes a variable speed video camera for capturing high speed events. The camera includes a rotating shutter having an opening which is continuously adjustable to vary the speed of exposure of an image sensor. The dimensions and configuration of a zoom lens, the rotating shutter and the image sensor are such as to make the camera compact, lightweight and easy to handle.

According to an aspect of the invention, the rotating shutter includes first and second shutter discs, each of which has a pair of openings which are alignable with the image sensor of the camera. The discs are mounted on respective first and second hollow shafts. The first shaft is slidably and rotatably mounted on the second shaft. A cable is connected at one end to the first shaft, is extended through said shafts and is connected at its other end to a control member. A linkage links the first and second shafts for concurrent axial and rotational displacement in a helical locus with respect to each other. Means are provided for actuating the control member in response to a change in the intensity of the video signal produced by said sensor to move said cable to cause said first shaft to move in a helical locus of displacement relative to said second shaft. Thereby, the relative opening between the two shutter discs is changed to change the shutter speed at which said image sensor is exposed to an image.

BRIEF DESCRIPTION OF THE DRAWINGS

In the following description of the drawings, like elements are numbered with like numbers.

FIGS. 5a-5b are respective graphs illustrating the operation of the high speed video camera of FIG. 2; and FIG. 6 is a partially sectional diagrammatic view of an embodiment of a variable speed shutter according to the present invention.

DESCRIPTION OF THE PREFERRED EMBODIMENT

Figure 1:
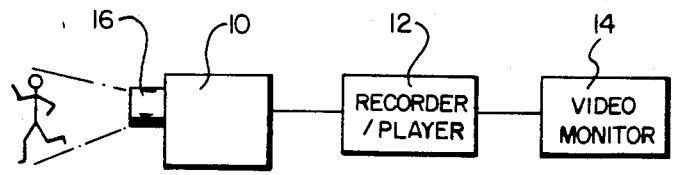
FIG. 1 is a block diagram of a high speed video system.

Referring now to the Figures, there is shown preferred embodiments of the invention. In FIG. 1, a video system for recording high speed events and for playing them back at slow or stopped motion is shown and includes a high speed video camera 10, a video cassette recorder/player 12, and a video monitor 14. Video camera 10 is a compact video camera which converts the image of a scene into a video signal. As will be explained in more detail later, the video camera 10 includes, in a compact, easy to use configuration a zoom lens 16, an image sensor 20, (such as a CCD or MOS solid state imager) for converting the image of a scene into a video signal, and a compact rotary shutter arrangement 22 located between zoom lens 16 and image sensor 20 for controlling the interval of exposure of the image during each video field or frame. Camera 10 and recorder/player 12 may be separate units or may be combined into a so-called "Camcorder".

Figure 3:
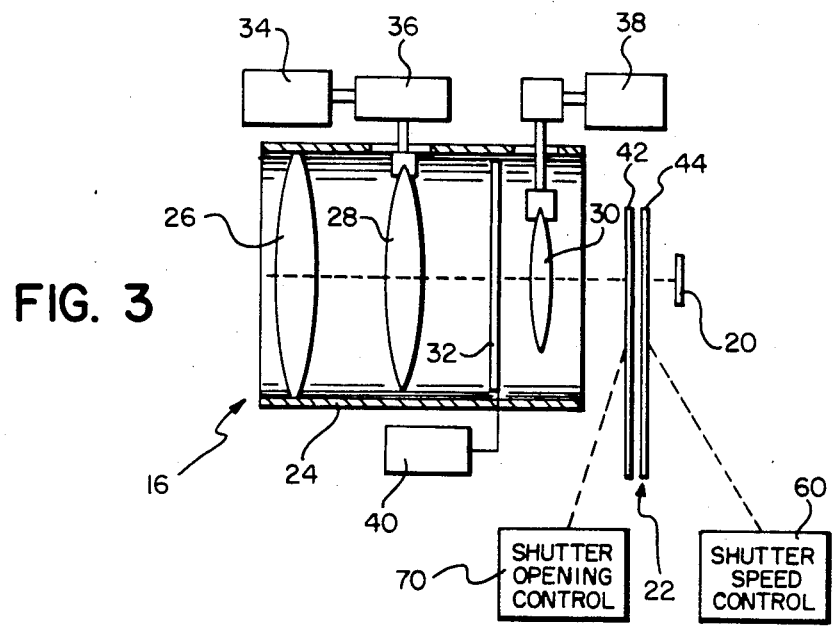
FIGS. 3 and 4 are respectively a top plan and a frontal view of the compact configuration of the major components of the camera of FIGS. 1 and 2.
Figure 4:
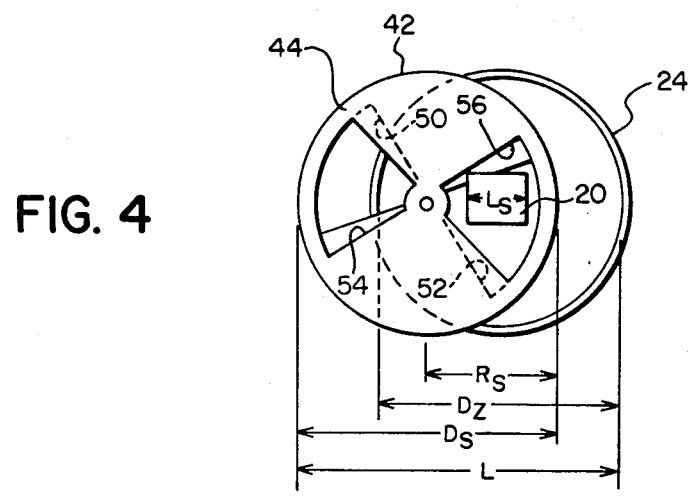

Referring now to FIG. 3 and 4, there is shown the compact configuration of the major components of camera 10 to provide a lightweight, easy to use camera for use in field conditions such as at athletic events of the like. Camera 10 includes a zoom lens barrel 24 including a front optical assembly 26, an intermediate movable optical assembly 28, and a rear optical assembly 30. A variable diaphragm 32 is positioned between optical assemblies 28 and 30. A zoom motor 34 is coupled to lens assembly 28 by means of gear assembly 36 and responds to zoom lens control signals to move assembly 28 either to the left or right (as shown in FIG. 3) to change the zoom ratio of the zoom lens 16. An automatic focus motor 38 is provided to move lens assembly 30 to the left or right in order to maintain the image projected onto imager 20 in focus through automatic focus control signals produced in a well known manner. An aperture control motor 40 is linked in a suitable manner to variable aperture 32 to change the opening of aperture 32 in order to control the light intensity of an image which is projected onto imager 20. Motors 34, 38, and 40 and associated linkages are dimensioned to make camera 16 as compact as possible.

Variable speed shutter 22 includes rotatable shutter discs 42 and 44 each of which has a pair of opposed sector shaped openings 50, 52 and 54, 56 (see FIG. 4).

Openings 50 and 54 and 52 and 56 are alignable with imager 20. Shutter discs 42 and 44 are rotated at the same rotational speed (by shutter speed control 60) but are rotationally adjustable with respect to each other (by shutter opening control 70) so that the shutter opening positions may be varied to vary the speed of exposure of imager 20 to an image projected onto it by zoom lens 16.

As shown in FIG. 4, the diameter $D_S$ of shutter discs 42 and 44 and the diameter $D_Z$ of zoom lens barrel 24 are dimensionally similar. Moreover, the radius $R_O$ of shutter openings 50–56, the length $L_S$ of sensor 20 and the radius $R_S$ of shutter discs 42 and 44 are dimensioned to make the combination of camera components compact for easy operator handling. As an example, if sensor 20 has a length $L_S$ of ½", the radius $R_O$ of openings 50–56 is chosen to be somewhat greater and the overall diameter $D_S$ of shutters 42, 44 may be 2 inches or less. If the diameter of zoom lens barrel 24 is also about 2 inches, the lateral dimension L is less than 1½ times the dimension of either the lens barrel or the shutter. This is in contrast to known shutters which are substantially (8× or 10×) larger than the focal plane dimension of the sensor or film.

Referring now to FIG. 6, a preferred embodiment of variable speed shutter assembly according to the present invention is shown. Shutter assembly 22 includes rotatable shutters discs 42 and 44 respectively mounted on hollow shafts 46 and 48. Shaft 46 is mounted on the end of shaft 48 which is mounted on an end of hollow shaft 57. Shaft 57 is mounted for rotation in bearings 58 and 66 and is driven by motor 60 through pulley 62, belt 63 and pulley 64 at a rotational speed which is a function of the video field rate of image 20 (e.g., 30 revolutions per sec. for an NTSC field rate of 60 fields per sec).

A spring clutch 68 is actuated by mechanism 69 to cause shaft 48 and disc 44 to be rotated at the same speed as shaft 57. Shaft 46 is mounted for both axial and rotational displacement with respect to shaft 48 by means of a pin 72 which is fixed to shaft 46 and which rides in helical slot 74 in shaft 48.

Relative movement between discs 42 and 44 is effected by control system 70 which includes a cable 78 which is attached at one end to shaft 46, which extends through shafts 46, 48 and 57 and which is attached at its other end to a control member 80. Member 80 is slidably mounted on the end of shaft 57 which is freely rotatable therein. A linking member 82 is pivotally mounted at pivot 84 and is pivotally connected at one end to member 80. Member 82 has a sector gear segment 86 which meshes with gear 88 drivenby reversible motor 90. A compression spring 92 is located between shafts 46 and 48 and biases shaft 46.

Rotational movement of shutter disc 42 with respect to shutter 44 is effected by shutter control 70 as a result of change in the intensity of light on image sensor 20. If a scene intensity change causes motor 90 to rotate gear 88 in a clockwise direction (as shown in FIG. 6), the tension on wire 78 by spring 92 is decreased and shaft 46 is moved to the left. Shutter disc 42 is rotated in a counterclockwise direction (as shown in FIG. 4) increasing the aperture and decreasing the shutter speed. Conversely, rotation of gear 88 by motor 90 in a counterclockwise direction increases the tension on wire 78 which moves shaft 46 to the left. Shutter disk 42 is moved in a clockwise direction (FIG. 4), narrowing the aperture and increasing the shutter speed.

By disengaging clutch member 67 from spring clutch 68, shaft 48 is no longer driven by shaft 57. Discs 42 and 44 may be positioned so that one of aperture pairs 50, 54 or 52, 56 are fully aligned with sensor 20.

Figure 2:
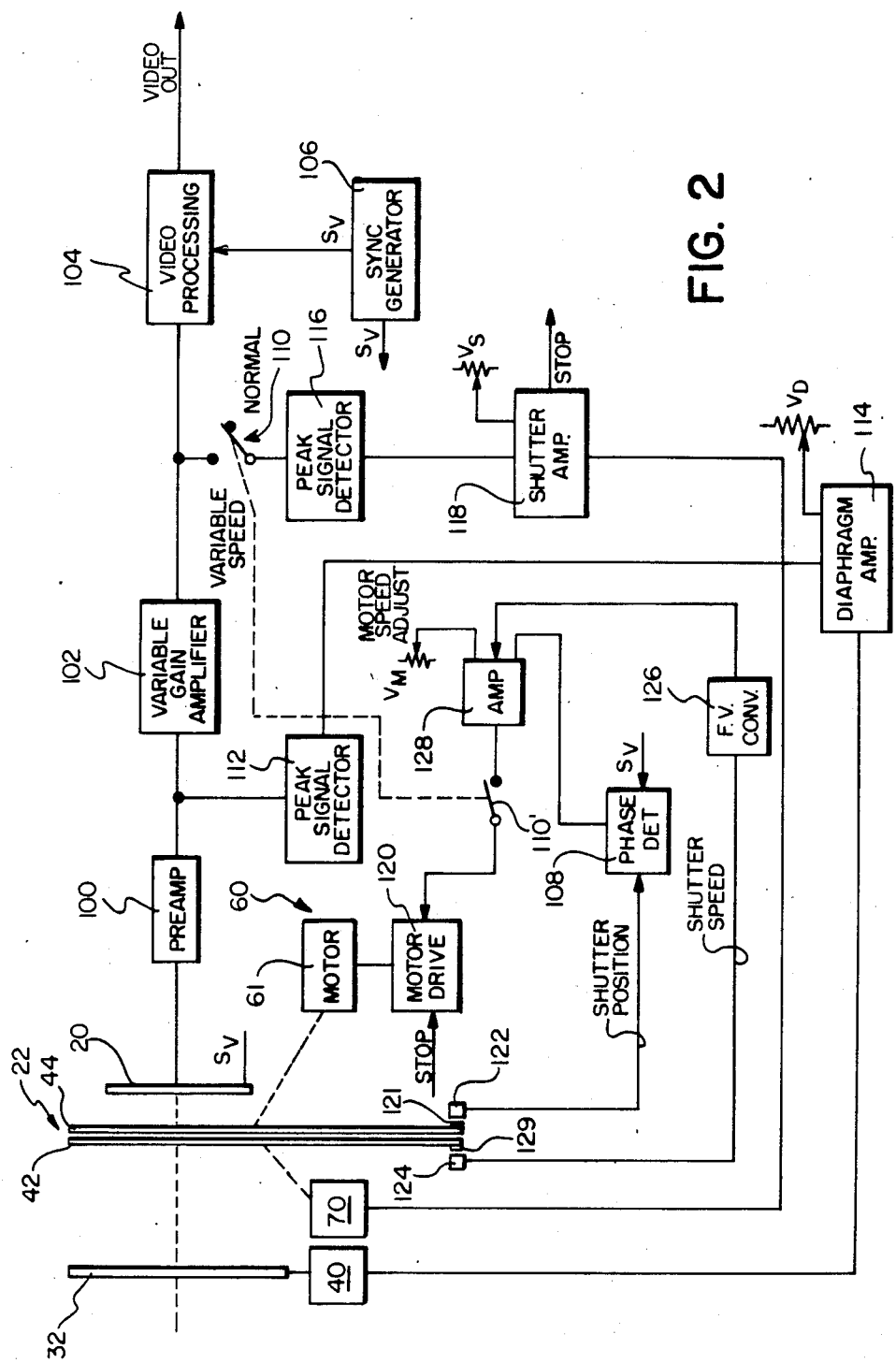
FIG. 2 is a partially diagrammatic, partially schematic view of a high speed video camera, according to a preferred embodiment of the present invention.

As shown in FIG. 2, the video signal produced by imager 20 is amplified by preamplifier 100 and a variable gain amplifier 102. Video processing circuit 104 converts the signal from amplifier 102 into an NTSC composite video signal for feed to the recorder/player 12. A sync generator 106 provides various synchronizing and blanking signals such as a vertical sync signal $S_V$ which is supplied to imager 20, video processing circuit 104 and as a reference signal to the phase detector 108.

Camera 10 is selectively operable in a normal mode or a variable speed mode. In the normal mode, shutter 22 is stationary and control of the intensity of an image on image 20 is effected solely by means of variable diaphragm 32. In the variable speed mode, both the intensity of light and the interval of exposure within a field interval is controlled by means of variable diaphragm 32 and variable shutter 22. A switch 110 is operable by the camera operator to effect one of the modes of operation.

In the normal mode of operation, shutter 22 is stationary and apertures 54, 50 or 56, 52 of shutter discs 42 and 44 are aligned with imager 20 to allow the full image to be projected upon imager 20. A peak signal detector 112 measures the signal after it has been amplified by preamplifier 100 and the detected signal is compared to a reference voltage $V_D$ in diaphragm differential amplifier 114. When the camera is not in use, diaphragm 32 is fully closed in order to prevent damage to imager 20 from excessively bright light. During camera operation, the intensity of light on imager 20 is controlled so that the video signal is maintained at a predetermined peak to peak value (typically 1 volt P-P). Thus, if the light intensity is low, diaphragm 32 will be opened more widely in order to allow more light to fall on imager 20. Conversely, if the intensity of light from the scene is high diaphragm 32 will be closed down to a small aperture in order to maintain the proper signal level. Thus, diaphragm control circuitry maintains a constant intensity of light on imager 20.

This mode of operation is illustrated in FIG. 5a, which depicts a graph of light intensity versus diaphragm opening and video signal level. The video signal level is shown in dashed lines as held constant at a level $S_1$ (e.g., 1 volt peak to peak). As the light intensity decreases, the diaphragm opening is increased. This is depicted in the solid line graph labeled "diaphragm opening". As illustrated, the f stop increases from f/22 to f/1.2 as light intensity decreases.

The variable speed mode integrates control of the variable diaphragm 32 with the variable shutter 22 to effect stop motion imaging of fast moving or changing events. In this mode, the fastest shutter speed is always set automatically in order to relieve the camera operator of the necessity of manually changing shutter speeds according to varying scene action changes. This provides the operator with a wider range of options in operating the camera. Moreover, as the light intensity of a scene diminishes, the peak to peak signal level is maintained constant by first controlling the variable diaphragm and then controlling the variable shutter. This assures the fastest shutter speed despite varying scene brightness.

This is shown in FIG. 5b in which the peak to peak video signal level is represented by a constant signal level dashed line. In the variable speed shutter mode the fastest shutter speed is maintained for given light conditions and the diaphragm is controlled in order to maintain a constant peak to peak video signal. Thus, as the scene brightness is varied over the range A to B, the shutter speed is maintained at its fastest speed, such as 1/10,000 sec. while the diaphragm opening is varied between a minimum and maximum range. This is depicted by the sloping solid line for the diaphragm opening and the horizontal dotted line for the shutter speed. If the scene brightness should decrease below level B, the diaphragm opening will be maintained at the maximum open position and the variable shutter will be controlled to decrease shutter speed until the light intensity or scene brightness C is reached. At this level, the relative angle of opening of the shutter disc openings is at a maximum (i.e., the openings are aligned) variable shutter 22 no longer capable of being adjusted. At this point, shutter discs 42 and 44 are stopped with the maximum shutter opening aligned with imager 20. The effective shutter speed then becomes the field rate of the camera (e.g., 1/60 sec). As scene brightness continues to decrease either the peak-to-peak video signal range lessens or the gain of variable gain amplifier 102 is increased.

Referring now to FIG. 2, there is shown circuitry for controlling the variable speed shutter 22. Closing of switch 110 connects peak signal detector 116 to the output of variable gain amplifier 102. The peak signal is detected and applied to a shutter differential amplifier 114 which compares the peak signal to a reference signal $V_S$. If the peak signal is below the reference level, a control voltage will be applied to shutter control 70 to vary the relative position of shutter disc 42 with respect to shutter disc 44. As described above, a control signal is provided by differential amplifier 114 only when the light intensity drops below level B in FIG. 5b. For light intensities above level B, the shutter speed is maintained at the fastest shutter speed that variable shutter 22 is capable. Thus, the smallest relative opening between a pair of openings 50, 54 or 52, 56 of discs 42 or 44 is effected.

For light intensities above level B, the peak to peak video signal level will be maintained by varying diaphragm 32. The control loop response relating to diaphragm control is faster than the control loop response relating to shutter control so that the aperture opening will be varied before shutter speed is varied.

As the light intensity decreases from level B to level C, the shutter discs 42 and 44 are rotated so as to open the effective shutter opening until the maximum shutter opening is attained with shutter openings 50, 54 and 52, 56 being aligned. This minimum shutter speed is limited by the angle of sector openings 50–56. For example if an opening (50–56) in disc 42, 44 has an angle of 60°, then the minimum shutter speed is 1/180 sec (i.e. 60°/180° × 1/60 sec.).

At this level of light intensity, shutter amplifier 118 will produce a stop signal which is applied to shutter motor driver 120 to stop the shutter discs 42 and 44 so that aligned apertures 50, 54, or 52, 56 are coextensive with imager 20. At this light intensity level, the maintenance of the peak to peak video signal at a constant level will be difficult unless, as explained above, automatic gain control is effected to increase the gain of amplifier 102 as the detected output signal from amplifier 102 decreases.

The circuit of FIG. 2 also includes a shutter speed control circuit 60 for maintaining the rotational speed of shutter discs 42 and 44 at a predetermined value and for synchronizing the phasing of the effective opening of discs 42 and 44 with the vertical sync of the video signal. Disc 44 is provided with a position indicator 121 which is detected by detector 122 to produce a shutter position signal. This signal is compared to the vertical sync signal by phase detector 108 and any variation produces a voltage which adjusts the relative positioning of discs 42 and 44 with respect to the vertical sync signal. Disc 42 is provided with a speed indicator 123 which is detected by detector 124 to produce a signal which is converted by frequency to voltage converter 126 into a voltage which is compared in amplifier 128 with a motor speed reference voltage $V_M$. The voltage produced by amplifier 128 is applied to motor driver 120 to control the speed of motor 61 and of discs 42 and 44.

Although the variable speed shutter/variable diaphragm control system of Figure 2 has been described with respect to specific mechanisms for adjusting the relative positioning of discs 42 and 44 it will be appreciated that other adjusting systems are contemplated within the scope of the present invention. Thus discs 42 and 44 could be driven by separate drive motors with separate motor control and phase control circuits.

The invention has been described in detail with particular reference to preferred embodiments thereof, but it will be understood that variations and modifications can be effected within the spirit and scope of the present invention.

What is claimed is:

1. A variable speed video camera comprising:
   an image sensor for producing a video signal representative of an image of a scene;
   first and second shutter discs, each of which has an aperture which is alignable with said image sensor;
   first and second hollow shaft means for respectively rotatably mounting said first and second shutter discs, said first shaft means being rotatably and slidably mounted on a portion of said second shaft means;
   a cable which is connected at one end to said first shaft means, which extends through said first and second hollow shaft means and which is connected at its other end to a control member;
   linkage means for linking said first and second hollow shaft means for concurrent axial and rotational displacement in a helical locus with respect to each other;
   means for rotating said first and second shaft means at a predetermined rotational speed thereby rotating said first and second shutter discs at said predetermined speed; and
   means for actuating said control member in response to a change in signal intensity of said sensor to thereby move said cable to cause said first shaft means to move in said helical locus of displacement relative to said second shaft means whereby said first and second shutter discs are rotated relative to each other to change the relative opening between said discs and thereby the shutter speed at which said sensor is exposed to said image.

2. The camera of claim 1 including third hollow shaft means for rotatably mounting said second hollow shaft means and wherein said cable extends through said third shaft means to said control member and wherein said rotating means is connected to said third shaft means.

3. The camera of claim 2 including clutch means for engaging and disengaging said second and third shaft means.

* * * * *